Figure 1:
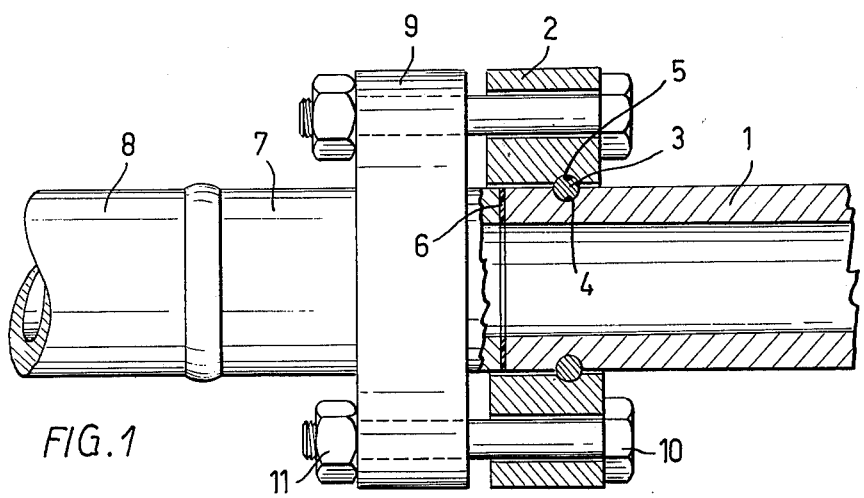

United States Patent [19]
Sundholm

[11] 3,966,234
[45] June 29, 1976

[54] FLANGE JOINT

[76] Inventor: Goran Vilhelm Sundholm, Makitie 4, Myllykyla, 01590 Maisala, Finland

[22] Filed: Feb. 21, 1975

[21] Appl. No.: 551,599

[30] Foreign Application Priority Data
Feb. 22, 1974 Finland .............................. 532/74

[52] U.S. Cl. ............................... 285/24; 285/305; 285/368; 285/415
[51] Int. Cl.² ......................................... F16L 23/00
[58] Field of Search ............ 285/368, 415, 414, 336, 285/24, 305, 321, 388, 387, 276, 277

[56] References Cited
UNITED STATES PATENTS

| | | | |
|---|---|---|---|
| 267,401 | 11/1882 | Brislin .................................. | 285/368 |
| 459,907 | 9/1891 | Hogan ............................. | 285/415 X |
| 478,496 | 7/1892 | Aird ................................ | 285/368 X |
| 1,686,498 | 10/1928 | Parker ............................ | 285/368 X |
| 1,851,574 | 3/1932 | Fiederlein ...................... | 285/415 X |
| 1,988,694 | 1/1935 | Mallay ........................... | 285/368 X |
| 2,081,021 | 5/1937 | Smith et al. .................... | 285/415 X |
| 2,125,677 | 8/1938 | Kuchenmeister .............. | 285/415 X |
| 2,967,068 | 1/1961 | Gressel ........................... | 285/415 X |
| 3,414,297 | 12/1968 | Pollia .............................. | 285/368 X |

FOREIGN PATENTS OR APPLICATIONS

| | | | |
|---|---|---|---|
| 1,327,104 | 4/1963 | France ............................... | 285/368 |
| 195,219 | 3/1923 | United Kingdom ................ | 285/368 |

*Primary Examiner*—Thomas F. Callaghan

[57] ABSTRACT

A flange joint for joining e.g. pipes, having at least one of the clamping flanges turnably mounted on one of the pieces to be joined, by means of a locking ring and locking grooves. When the flange is in tightening position the forward part of it forms a guide and a support for the other piece and for a packing fitted in between.

6 Claims, 7 Drawing Figures

FLANGE JOINT

This invention relates to a flange joint. Flange joints are used especially for joining cylindrical pieces, such as pipes, whereby each piece to be joined is provided with a clamping flange.

In general, clamping flanges or welding nipples made in one piece are used which are firmly joined to the ends of pipes etc. by welding. The manufacturing and material costs of these flanges are rather high; during the mounting again, due to the unturnability of the flanges, it is often difficult to bring the tightening holes of the flanges opposite to each other.

In order to eliminate this disadvantage, a clamping flange turning around a pipe to be joined etc. has been developed, in which the opening toward the joint has been widened so that the flange can be pushed over a lock ring arranged in a groove formed in the piece to be joined and extending from this groove. The bottom of the widening forms a stop for the lock ring.

Such a flange is advantageous to its manufacturing and material costs and, due to the turnability of the flange, the assembly of the flange joint is facilitated. However, no exact guidance nor support for the parts to be joined and the packing fitted in between them can be achieved therewith without special arrangements.

The object of this invention is to produce a flange joint, which is durable and easy to install, the material and manufacturing costs of which are low and which offers a guide and support for both pieces to be joined and for a packing fitted in between them.

This is achieved with the flange joint according to the invention, in which at least a flange joint with at least one of the clamping flanges turnably mounted on a piece to be joined by means of a locking ring in corresponding grooves formed in the clamping flange and in said piece to be joined. Said grooves in the clamping flange and in said piece are arranged in such a way that when the flange is in position to be tightened the distance from the back edge of the flange groove to the forward edge of the flange is greater than the distance from said back edge of the flange groove to the joining point for the pieces to be joined, the forward position of said flange thus forming a guide and a support for the other piece to be joined and for a packing fitted in between.

The invention will be described in detail in the following with reference to the accompanying drawings.

FIG. 1 shows in partial section the structure in principle of the flange joint according to the invention, and FIGS. 2 to 7 show advantageous embodiments of the flange joint according to the invention.

In FIG. 1 the pieces 1 and 7 to be joined together are both cylindrical; a pipe and a welding nipple. The welding nipple 7 has been welded on another pipe 8. A clamping flange 2 is arranged around the pipe 1, and a second clamping flange 9 around the nipple 7. Flanges 2 and 9 are tightened together with suitable means, e.g. a screw/nut combination 10, 11. Of the clamping flanges 2 and 9 at least one, in FIG. 1 flange 2, is arranged around the piece 1 to be joined as follows: in the clamping flange 2 is formed a first groove 5, and in the pipe 1 is formed a second groove 4. When these grooves are arranged opposite to each other, they form a substantially closed space, wherein a retaining means 3 is arranged. Grooves 4 and 5 can extend partially or entirely around the periphery of the pipe 1 and flange 2. The retaining means 3 extends from the groove 4 to the groove 5 of the flange 2, filling this partially or completely. In the embodiment according to FIG. 1, a ring 3 made up of one or several parts and extending partially or completely around the pipe 1 is serving as the retaining means. The ring 3 is advantageously of metal but can, of course, also be made of other suitable material. In the drawings the ring 3 is round in cross-section, but it can, naturally, also have another cross-sectional form. The ring 3 allows turning of the flange around the pipe. Grooves 4 and 5 are arranged in such a way that when the flange is in position to be tightened the distance from the back edge of the flange groove to the forward edge of the flange is greater than the distance from said back edge of the flange groove to the joining point. Thus the front edge of the flange 2 extends over the joining point between pieces 1 and 7 forming an exact guide and support also for the nipple 7 and a packing 6 arranged in between. The second clamping flange 9 of the flange joint can be of any suitable type.

In the embodiment according to FIG. 1, the flange 2 can first be arranged around the pipe 1 so that grooves 5 and 4 are opposite to each other. The retaining means 3 can thereafter be threaded in place through a lateral opening bored in the flange 2. The flange 2 can also be divided into two sections which are connected together e.g. with a hinge joint. Thereby the ring 3 is first placed in the groove 4, whereafter the flange 5 is closed around the pipe.

Figure 2:
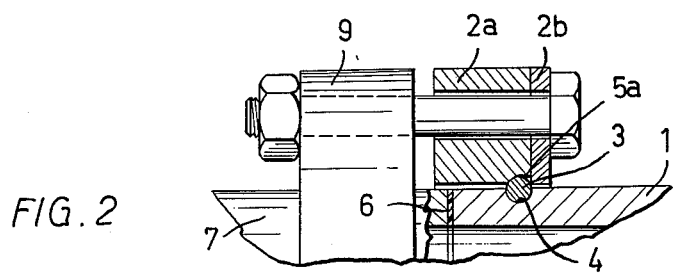

In the embodiment according to FIG. 2, the flange is, in order to facilitate the mounting, divided axially into two sections 2a and 2b, whereby the groove 5a is arranged in connection with the separating surface between these sections 2a and 2b. The mounting can take place e.g. in the sequence: section 2b, ring 3, and section 2a.

Figure 3:
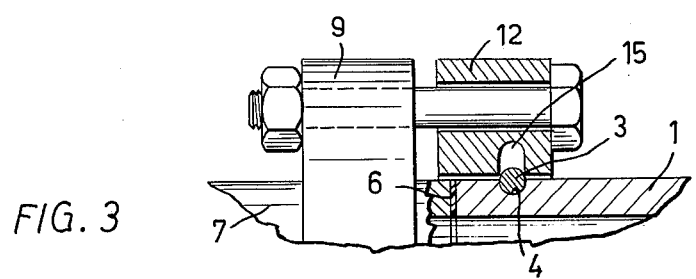

In the advantageous embodiment according to FIG. 3, the groove 15 formed in the flange 12 has been made so deep that it can receive the ring 3 entirely. The ring 3 is then dimensioned so that it resiliently tightens around the pipe 1.

The ring 3 is first forced against its spring force entirely into the groove 15 whereby the flange 12 can be pushed on to the pipe 1. When grooves 15 and 4 get opposite each other, the ring 3 snaps into the groove 4 and stays there by its own force. If the ring 3 is substantially round in cross-section, the groove 4 must be so deep that it receives more than one half of the ring 3 in order to prevent the flange 12 from lifting the ring 3 up from the groove 4 when the flange joint is tightened.

In the embodiment according to FIG. 4 again, a groove 25 of a clamping flange 22 has been made so wide that the clamping flange 22 can be moved along the pipe 1, on one hand, into a forward position where the front edge of the flange 2 exceeds the joining point of pieces 1 and 7 forming a guide and support for them and the packing 6 fitted in between, and on the other hand, when the screw/nut combination is unscrewed, into a pulled back position in which said joining point is exposed. On account of this, the joint is substantially easier to disassemble directly in radial direction, whereby e.g. the packing 6 is easy to change.

Figure 4:
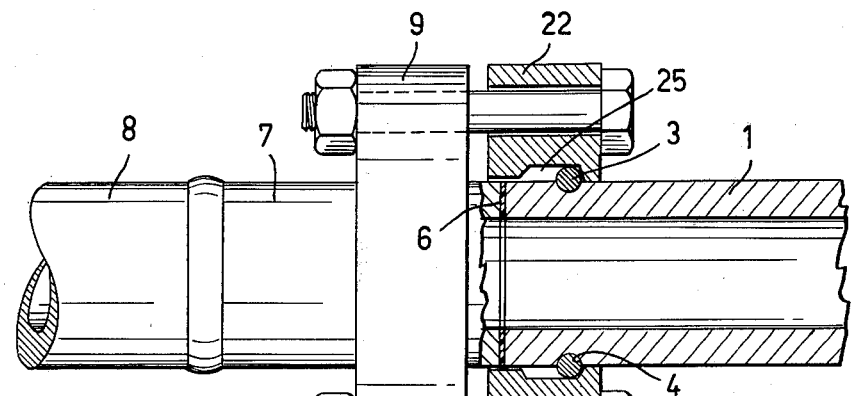
Figure 5:
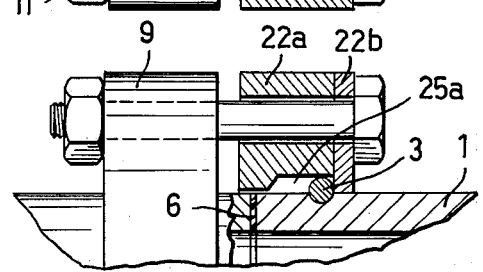
Figure 6:
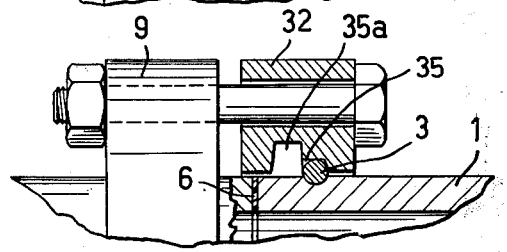

In the embodiment according to FIG. 4, wherein the depth of the groove 4 of the flange 22 substantially completely corresponds to the protrusion of the ring 3 from the groove 4, the mounting can take place in the same way as was presented in connection with FIG. 1. In FIG. 5, the clamping flange is, similarly to FIG. 2, divided into two sections 22a and 22b, again, the groove 25a is arranged in connection with the separating surface between these sections. In FIG. 6 agains, a groove 35 of a flange 32 is provided with a deepened portion 35a which can receive the ring 3 completely. The recess 35a is advantageously arranged so that the ring 3 is not located at it when the joint is tightened. In the assembly and mounting of the embodiments according to FIGS. 5 and 6 the same methods are used as in the embodiments of FIGS. 2 and 3.

In all above described embodiments it is enough, in order to achieve the desired main advantages, that one clamping flange of the flange joint, i.e. flanges 2; 2a, 2b; 12; 22; 22a; 22b; 32, has been of one of the above described types. The other flange marked in FIGS. 1 to 6 with number 9 may be of any suitable type, even fixed.

Figure 7:
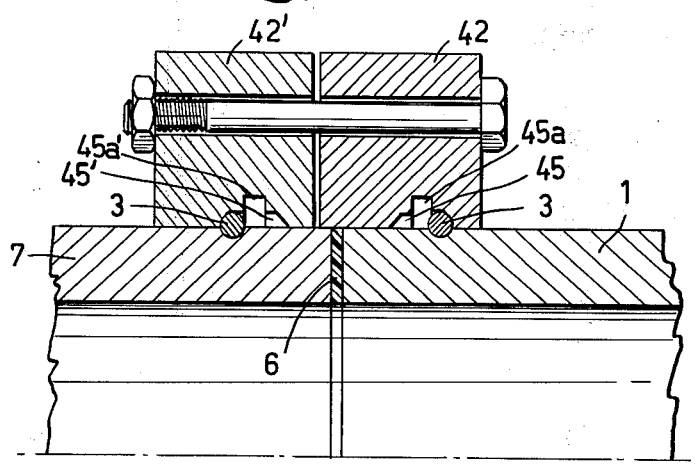

It is, however, obvious that it would be advantageous to use two identical clamping flanges in the flange joint and to arrange the retaining means 3 always at the same distance from the joining point between the pieces to be joined. FIG. 7 shows one such embodiment. The same solution in principle is used therein as in FIG. 6, but recesses 45a and 45a' are arranged at the middle of grooves 45 and 45'. What is essential in this embodiment is, however, the fact that the distance from the forward edge of the flange groove to the back edge of the flange is less than the distance from the back edge of the flange groove to the joining point of the pieces to be joined.

It is to be noted that reference is here made to clamping flange 42 (or 2, 12, 22, 32) overlapping the joining point; in the complementary, identical flange 42' (or 9 in FIGS. 1–6) "forward edge" and "back edge" will naturally mean the opposite edges of the flange itself, as forward edge means the edge closer to the joining point, in the figures.

The above dimensioning thus enables the use of only one simple type of clamping flange while preserving all advantages aforementioned and is therefore preferably used also in connection with the embodiments of FIGS. 1–6.

In FIGS. 4 to 7 of the drawing, the groove allowing the movement of the clamping flange is formed in the clamping flange, and the retaining means stays in place in its groove in the piece to be joined. If desired, a reverse arrangement can naturally also be used, whereby the widened groove would be formed in the pieces to be joined, and the retaining means would move therein along with the clamping flange.

The embodiments here described can naturally be used also for the joining of other than cylindrical pieces with all same advantages except for, of course, turnability.

What I claim is:

1. A flange joint comprising; a pair of tubular pieces to be joined, a clamping flange mounted on each of said pieces, a packing positioned between said pieces, means cooperating with said flanges for securing said pieces together, at least one of the clamping flanges turnably mounted on one of said pieces to be joined by means of a locking ring in corresponding grooves formed in the clamping flange and in said piece to be joined said grooves in the clamping flange and in said piece being arranged in such a way that when the flange is in position to be tightened the distance from the back edge of the flange groove to the forward edge of the flange is greater than the distance from said back edge of the flange groove to the joining point for the pieces to be joined, the distance from the forward edge of the flange groove to the back edge of the flange being less than the distance from the back edge of the flange groove to the joining point of the pieces to be joined, the forward portion of said flange surrounds the other piece and has an internal diameter slightly greater than the outer diameter of the other piece and thus forms a guide and a support for the other piece to be joined and for the packing fitted in between them.

2. A flange joint according to claim 1, wherein either the flange groove or the groove in said piece, e.g. a pipe, is made so wide that the clamping flange can be moved backwards to a position in which said joining point is exposed.

3. A flange joint according to claim 2, wherein the depth of said widened groove essentially throughout the whole width thereof essentially corresponds to the part of the locking ring protruding from the pipe groove.

4. A flange joint according to claim 2, wherein said widened groove has a recess.

5. A flange joint according to claim 4, wherein said recess is provided at the forward edge of the groove.

6. A flange joint according to claim 4, wherein said recess is provided at the center of the groove.

* * * * *